(12) United States Patent
Burcea et al.

(10) Patent No.: US 9,652,243 B2
(45) Date of Patent: May 16, 2017

(54) PREDICTING OUT-OF-ORDER INSTRUCTION LEVEL PARALLELISM OF THREADS IN A MULTI-THREADED PROCESSOR

(75) Inventors: Ioana Monica Burcea, Toronto (CA); Alper Buyuktosunoglu, White Plains, NY (US); Brian Robert Prasky, Wappingers Falls, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 13/172,218

(22) Filed: Jun. 29, 2011

(65) Prior Publication Data
US 2013/0007423 A1 Jan. 3, 2013

(51) Int. Cl.
G06F 9/38 (2006.01)

(52) U.S. Cl.
CPC .......... G06F 9/3836 (2013.01); G06F 9/3851 (2013.01)

(58) Field of Classification Search
CPC ..................................... G06F 9/3851
See application file for complete search history.

(56) References Cited

U.S. PATENT DOCUMENTS

| | | | |
|---|---|---|---|
| 6,073,159 A * | 6/2000 | Emer et al. | 718/103 |
| 6,721,874 B1 * | 4/2004 | Le et al. | 712/218 |
| 6,928,647 B2 | 8/2005 | Sager | |
| 7,392,366 B2 | 6/2008 | Bose et al. | |
| 7,827,388 B2 | 11/2010 | Ward et al. | |
| 2001/0056456 A1 | 12/2001 | Cota-Robles | |
| 2003/0005263 A1 | 1/2003 | Eickemeyer et al. | |
| 2007/0204137 A1 * | 8/2007 | Tran | 712/214 |
| 2007/0204139 A1 | 8/2007 | Swendsen | |

(Continued)

FOREIGN PATENT DOCUMENTS

GB 2421328 A 6/2006

OTHER PUBLICATIONS

Homayoun, Houman, et al., "Thread Scheduling Based on Low-Quality Instruction Prediction for Simultaneous Multithreaded Processors," The 3rd International NEWCAS Conference, Jun. 19-22, 2005, Québec City, Canada, pp. 319-322, IEEE Digital Library.

(Continued)

Primary Examiner — John Lindlof
(74) Attorney, Agent, or Firm — Ference & Associates LLC (57) ABSTRACT

Systems and methods for predicting out-of-order instruction-level parallelism (ILP) of threads being executed in a multi-threaded processor and prioritizing scheduling thereof are described herein. One aspect provides for tracking completion of instructions using a global completion table having a head segment and a tail segment; storing prediction values for each instruction in a prediction table indexed via instruction identifiers associated with each instruction, a prediction value being configured to indicate an instruction is predicted to issue from one of: the head segment and the tail segment; and predicting threads with more instructions issuing from the tail segment have a higher degree of out-of-order instruction-level parallelism. Other embodiments and aspects are also described herein.

16 Claims, 4 Drawing Sheets

(56) References Cited

U.S. PATENT DOCUMENTS

2008/0109640 A1 5/2008 Burky et al.
2009/0138682 A1* 5/2009 Capps, Jr. ........... G06F 9/30101
 712/220
2009/0193240 A1 7/2009 Gschwind et al.

OTHER PUBLICATIONS

Eyerman, Stijn, et al., "Probabilistic Job Symbiosis Modeling for SMT Processor Scheduling," Architectural Support for Programming Languages and Operating Systems (ASPLOS), Mar. 13-17, 2010, Pittsburgh, Pennsylvania, USA, 12 pages, ACM Digital Library.
Subramaniam, Samantika, et al., "PEEP: Exploiting Predictability of Memory Dependences in SMT Processors," Georgia Institute of Technology, College of Computing, 2008, 12 pages, Can be found at: http://www.cs.utah.edu/hpca08/papers/2A_1_Subramaniam.pdf, Accessed Nov. 14, 2013, IEEE Digital Library.
Meswani, Mitesh R., et al., "Evaluating the Performance Impact of Hardware Thread Priorities in Simultaneous Multithreaded Processors using SPEC CPU2000," Univ. of TX at El Paso, Dept. of Computer Science, Workshop on the Interaction Between Operating Systems and Computer Architecture (WIOSCA) and International Symposium on Computer Architecture (ISCA-33), Jun. 17, 2006, Boston, MA, USA, 7 pages, Can be found at: http://www.cs.sfu.ca/~fedorova/Teaching/CMPT886/Spring2007/papers/hardware-thread-priorities.pdf, Accessed Nov. 14, 2013.
Francisco Cazorla et al., "DCACHE Warn: an I-Fetch Policy to increase SMT Efficiency", Proceedings of the 18th International Parallel and Distributed Processing Symposium, Apr. 26-30, 2004, 10 pages, Santa Fe, New Mexico, USA.
Pedro Marcuello, et al., "Exploiting Speculative Thread-Level Parallelism on a SMT Processor", International Conference on High-Performance Computing and Networking, Apr. 12-14, 1999, pp. 191-200, Amsterdam, The Netherlands.

Dean M. Tullsen, et al., "Exploiting Choice: Instruction Fetch and Issue on an Implementable Simultaneous Multithreading Processor", 23rd Annual International Symposium on Computer Architecture, May 22-24, 1996, pp. 191-200, Philadelphia, PA, USA.
Dean M. Tullsen, et al., "Handling long-latency loads in a simultaneous multithreading processor", Proceedings of the 34th annual ACM/IEEE international symposium on Microarchitecture, Dec. 1-5, 2001, pp. 318-329, Austin, Texas, USA.
Kun Luo, et al., "Boosting SMT Performance by Speculation Control", Proceedings of the 15th International Parallel & Distributed Processing Symposium, Apr. 23-27, 2001, 8 pages, San Francisco, CA, USA.
Francisco J. Cazorla, et al., "Dynamically Controlled Resource Allocation in SMT Processors", Proceedings of the 37th annual IEEE/ACM International Symposium on Microarchitecture, Dec. 4-8, 2004, 12 pages, Portland, Oregon, USA.
Seungryul Choi, et al., "Learning-Based SMT Processor Resource Distribution via Hill-Climbing", Proceedings of the 33rd annual international symposium on Computer Architecture, Jun. 17-21, 2006, 12 pages, Boston, MA, USA.
Huaping Wang, et al., "An adaptive resource partitioning algorithm for SMT processors", Proceedings of the 17th international conference on Parallel architectures and compilation techniques, Oct. 25-29, 2008, pp. 230-239, Toronto, Canada.
Stijn Eyerman, et al., "A Memory-Level Parallelism Aware Fetch Policy for SMT Processors", Proceedings of the 2007 IEEE 13th International Symposium on High Performance Computer Architecture, Feb. 10-14, 2007, 10 pages, Phoenix, Arizona, USA.
International Search Report for Application No. GB1210975.7, Oct. 23, 2012, 9 pages, Intellectual Property Office, South Wales, Great Britain.
Edwards, Mark, Examination Report Under Section 18(3) in Application No. GB1210975.7, Sep. 25, 2013, 4 pages, Intellectual Property Office, South Wales, Great Britain.
Abel & Imray, Response to Examination Report Under Section 18(3) in Application No. GB1210975.7, Nov. 20, 2013, 13 pages, Intellectual Property Office, South Wales, Great Britain.

* cited by examiner

PREDICTING OUT-OF-ORDER INSTRUCTION LEVEL PARALLELISM OF THREADS IN A MULTI-THREADED PROCESSOR

FIELD OF THE INVENTION

The subject matter presented herein generally relates to multi-threaded processors and predicting out-of-order instruction-level parallelism (ILP) of threads running therein.

BACKGROUND

Typical high-performance processors use a technique called simultaneous multi-threading (SMT) to more effectively utilize resources and further improve efficiency. This technique allows multiple independent threads to run on a single processor and to issue multiple instructions each cycle. SMT is a means of converting thread-level parallelism (i.e., multiple processors) to instruction-level parallelism (ILP) (i.e., one processor). In general, ILP is a measure of the average number of instructions in a program that a processor can evaluate simultaneously.

To an operating system, a SMT processor appears as two logical processors capable of running multiple threads simultaneously. Efficiently running multiple threads simultaneously on the same processor using SMT involves effectively scheduling thread execution and controlling thread access to shared processor resources.

BRIEF SUMMARY

One aspect provides a method of predicting out-of-order instruction-level parallelism of threads being executed in a multi-threaded processor, comprising: tracking completion of instructions using a global completion table having a head segment and a tail segment; storing prediction values for each instruction in a prediction table indexed via instruction identifiers associated with each instruction, a prediction value being configured to indicate an instruction is predicted to issue from one of: the head segment and the tail segment; and predicting threads with more instructions issuing from the tail segment have a higher degree of out-of-order instruction-level parallelism.

Another aspect provides a system for predicting out-of-order instruction-level parallelism of threads being executed in a multi-threaded processor, comprising: a global completion table having a head segment and a tail segment, the global completion table being configured to track completion of instructions; a prediction value indicating an instruction is predicted to issue from one of: the head segment and the tail segment; and a prediction table configured to store the prediction value for each instruction, the prediction table being indexed via instruction identifiers associated with each instruction wherein threads with more instructions issuing from the tail segment are predicted to have a higher degree of out-of-order instruction-level parallelism.

A further aspect provides a computer program product comprising: a computer readable storage medium having computer readable program code configured to predict out-of-order instruction-level parallelism of threads being executed in a multi-threaded processor embodied therewith, the computer readable program code comprising: computer readable program code configured to track completion of instructions using a global completion table having a head segment and a tail segment; computer readable program code configured to store prediction values for each instruction in a prediction table indexed via instruction identifiers associated with each instruction, a prediction value being configured to indicate an instruction is predicted to issue from one of: the head segment and the tail segment; and computer readable program code configured to predict threads with more instructions issuing from the tail segment have a higher degree of out-of-order instruction-level parallelism.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Developers continually endeavor to produce computing systems that provide increased value with respect to cost per workload. Cost per workload for a given machine may be described in terms of the time required to run a particular job (i.e., wall clock time) and the number of jobs the machine may execute in parallel (i.e., throughput). Existing technology has relied heavily on frequency scaling to increase processor performance and decrease cost per workload. However, the viability of this solution has become severely limited because frequency scaling requires raising processor voltage, which leads to a cubic function of power. Designs for improving processor and thread performance must be evaluated based on providing limited peak power while holding or improving single thread performance, all while significantly improving the throughput of the processor.

The introduction of simultaneous multi-threading (SMT) allowed for the leveraging of a processor to run more than one thread at the same time on a single processor. This leveraging provided many efficiency and performance advantages, such as achieving more work per joule of energy. However, because processor frequency is no longer scaling, developers have been designing wider pipeline systems to leverage additional performance per thread. The wider systems are being designed to increase single thread performance and present a great opportunity for SMT, such as the ability to run multiple threads across a pool of resources. However, for certain workloads, wider systems are not applicable, such as limited instruction-level parallelism (ILP) workloads. As such, new focal points for improving performance of SMT processors are currently being investigated. For example, SMT processors allow more misses to be processed in parallel, which allows for an improvement in overall processor throughput.

In addition to frequency scaling, existing technologies have also focused on instruction fetch and issue policies as methods for improving SMT efficiency, including, for example, round-robin, ICOUNT, cache miss weighting, and balanced flush policies. In general, a processor operating under the round-robin policy issues instructions from the next active thread each cycle, essentially alternating thread processing without regard to resource balancing. The ICOUNT policy attempts to keep instruction counts equal and may be configured to give priority to threads with the lowest number of instructions in the decode, dispatch, and issues stages. Cache miss weighting recognizes that cache misses limit ILP, and the balanced flush policy attempts to flush out threads creating instruction pipeline roadblocks.

In addition to the four SMT fetch policies named above, alternative fetch policies have also been implemented according to existing technology. Some of these alternative policies may encompass or incorporate characteristics of the round-robin, ICOUNT, cache miss weighting, and balanced flush policies. For example, policies have been configured that give higher priority to threads with fewer instructions in the pipeline, fewer outstanding data cache misses, fewer instructions in the front-end of the pipeline, or fewer older instructions in the issue queue (IQ). Existing policies also include an approach where threads with low confidence in-flight branches are given lower priority for instruction fetch, thereby reducing the proportion of instructions fetched and executed from the wrong path. A technique has also been implemented that favors threads with more L1 data cache misses in an attempt to provide more resources for slow threads, allowing them to exploit the available out-of-order instruction-level parallelism.

Instruction fetch policies may also be based on measuring the efficiency of threads, for example, measuring efficiency based on the ratio of the number of instructions committed to the number of resources allocated in a particular interval for a particular thread. The efficiency of a thread may then be used in resource allocation decisions, such as allocating more resources in the next interval of execution to the thread utilizing processor resources most efficiently. Another instruction fetch policy according to existing technology focuses on distributing resources, such as IQ, rename registers, and reorder buffers to threads in a multithreaded processor. One implementation of this fetch policy configuration utilizes a "hill-climbing" approach where an initial set of distributions are used for equal intervals, and the distribution with the highest performance is chosen for the next epoch of execution.

Additional approaches to improving SMT performance concern long latency loads for threads being executed by an SMT processor. For example, one policy involves stalling instruction fetching for a thread that incurs a long-latency load, or, even more aggressively, flushing the instructions already fetched for a thread that incurs a long-latency load. Other existing policies also focuses largely on long latency loads (e.g., L2 miss, DTLB miss) in determining thread priority. In another existing policy that involves long latency loads, predictions are made regarding whether a load is a long latency operation and the number of instructions that have to be fetched to expose the memory-level parallelism (MLP) to overlap two long latency loads for each thread. For a thread with a load predicted to be a long latency operation with an MLP of n instructions, fetching is stalled after fetching n instructions. An additional policy involving long latency loads is configured to react after it is known that a load instruction is a long latency operation, and if more than MLP distance instructions have already been fetched, then the additional instructions over and above the MLP instructions are flushed.

In addition to fetch prioritization, previous attempts at improving SMT efficiency have also included prioritizing scheduling of instructions for execution. Exemplary prioritized scheduling schemes include oldest first scheduling, speculative last scheduling, which lowers the priority for instructions on the speculative path, and branch first scheduling, which schedules branches as early as possible.

As demonstrated by the summary of SMT policies according to existing technology provided above, prior work concerning thread prioritization and improving SMT performance has been reactive instead of proactive. Previous solutions have been designed to react to a specific set of events during the course of instruction execution, and then to alter thread priority based on the outcomes of these events. A major drawback of such techniques is that the particular outcomes associated with the set of events may not accurately reflect program behavior at certain points in the future, such as when instructions are repeated. As such, any resulting thread prioritization may not actually improve overall processor efficiency, and may in fact decrease efficiency. In addition, thread prioritization techniques according to existing technology do not have the capability to observe and learn from event outcomes. As such, these techniques are prone to repeat the same set of actions when the program re-visits a section of code in the future, even if the actions decrease processor efficiency.

For example, SMT demonstrates certain inconsistencies involving running certain threads or tasks together. These inconsistencies may be the result of, inter alia, resource competition or threads not effectively sharing resources. As such, given four tasks, A, B, C, and D, tasks A and B may run efficiently together, but running tasks A and C together or tasks B and D together may produce significantly different outcomes. SMT prioritization techniques according to existing technology are not capable of learning which threads run efficiently together and which do not. Thus, such techniques may repeatedly prioritize threads inefficiently. Thus, although SMT provides performance benefits, it may also generate a significant level of inefficiency when using the reactive SMT policies provided by existing technology. For example, given the reactive nature of current prioritization techniques, queue resources may only be balanced within limited time frames. To illustrate, after a wrong branch occurs in a first thread, a second thread may start to dominate available resources, although the second thread may not be able to leverage the resources it is claiming. Furthermore, research has indicated that without having the foresight of knowing how well a thread can leverage available resources, such as with the reactive processes of current techniques, a thread can utilize excess resources when an opposing thread is in a state where it does not have any resource requirements.

Embodiments provide for a proactive approach to thread prioritization in a multi-threaded processor, including, but not limited to, SMT and fine-grained multi-threaded processors. According to embodiments, multi-threaded processor efficiency may be improved by tracking the effectiveness of prioritization decisions and using the outcomes of prioritization decisions to predict a course of action for future occurrences of the same or similar instruction sequences. Embodiments provide a process for proactively predicting out-of-order ILP in a multi-threaded processor. As a non-limiting example, embodiments may use the prediction of out-of-order ILP for managing thread priority in the processor. Embodiments are configured to monitor specific resources in a processor pipeline and to predict utilization of computer resources by different threads.

Existing SMT designs create an environment where each thread essentially has to fight for its share of resources. To the contrary, proactive approaches provided through embodiments described herein may be configured such that threads no longer have to fight for resources; instead, threads are capable of sharing resources. In addition, embodiments provide that threads may limit their use of processor resources given the other threads in the system, including, but not limited to, by only pursuing an amount of processor resources that they may use most effectively.

Embodiments may be configured to prioritize fetching and dispatching among multiple threads in a multi-threaded processor system based on, inter alia, the out-of-order instruction-level parallelism (ILP) associated with one or more threads. Using prediction based on prior outcomes according to embodiments provided herein, embodiments provide that threads with higher out-of-order ILP may get access to fetch and dispatch resources in order to improve overall throughput. In addition, embodiments may track the effects of previous predictions and generate a corresponding prediction history, which may be continually updated for future use. Embodiments may further be configured to balance thread resources such that, when a thread requires it, the thread may leverage up to the entire width of the instruction pipeline, and when the thread cannot leverage the width/queues of the pipeline, it does not starve other threads which may be able to utilize processor resources.

Figure 1:
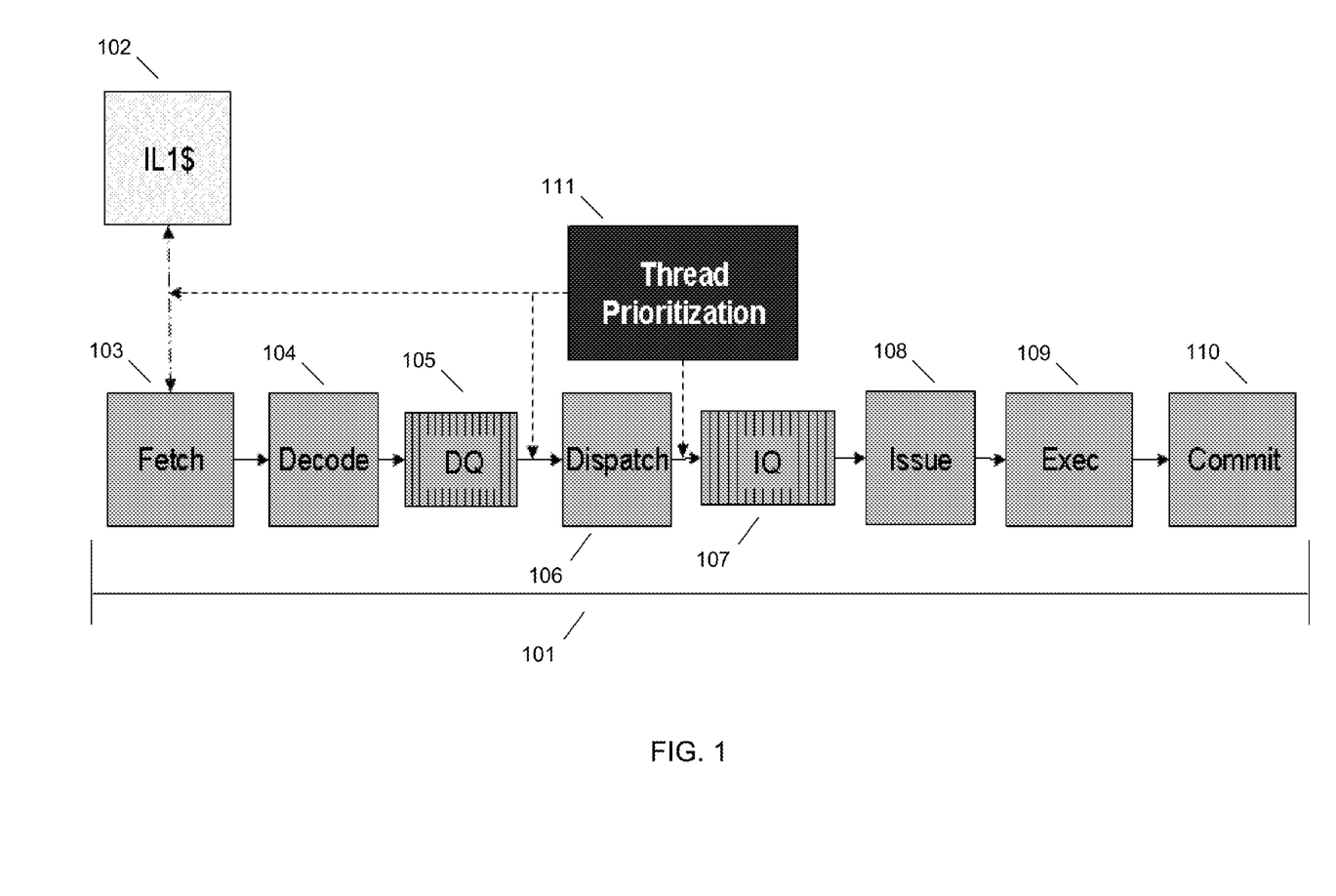
FIG. 1 provides an example processor instruction pipeline according to an embodiment.

Referring to FIG. 1, therein is provided an exemplary processor instruction pipeline modified according to an embodiment. At a high-level, instructions may be fetched from the instruction cache 102 and sent to the front-end of the processor pipeline 101 including fetch 103, decode 104, dispatch 106, and issue 108 stages. These front-end stages 103, 104, 106, 108 correspond, respectively, to fetching, decoding, in-program-order dispatching, and out-of-order issuing of instructions to the execution units 109. The back-end of the processor pipeline 101 is comprised of the execution units 109, such as integer, floating point, and load/store execution units, and a commit unit 110 which decides when it is safe to store the result from an execution unit 109. As demonstrated in FIG. 1, embodiments provide for thread prioritization 111 occurring at the fetch 103 and dispatch 106 stages.

In the case of an SMT processor, more than one thread of execution may share buffers or queues configured between the front-end stages of execution, namely fetch 103, decode 104, dispatch 106, and issue 108. The SMT processor illustrated in FIG. 1 provides for one queue between the decode 104 and dispatch 106 stages called the "dispatch" queue (DQ) 105, and one queue between the dispatch and issue stages called the "issue" queue (IQ) 107. The DQ 105 maintains a queue of tasks for submission to dispatch 106. The IQ 107 specifies which instructions get executed and when. For example, the IQ 107 may execute instructions based on the dependencies of instructions in the pipeline. Multiple threads being executed by the SMT processor may dynamically share the DQ 105 and IQ 107. In addition, instructions may be moved into the IQ 107 in order, while the IQ 107 may allow for the out-of-order issue of instructions to the different execution units 109. More than one thread of execution may share the buffers or queues between these front-end stages in an SMT processor, namely the dispatch queue (DQ) 105 and issue queue (IQ) 107 depicted in FIG. 1.

An IQ has a limited number of slots available for instructions. For an out-of-order IQ, as the size of the IQ is quadrupled, the out-of-order window increases two-fold on average. To illustrate, an exemplary IQ may have an entry size of eight and, because of dependencies, the IQ may only be able to handle three instructions before having to wait for content (e.g., obtaining data from the cache). If the entry size of this exemplary IQ is quadrupled to 32, then six instructions could potentially be performed out of order before having to wait for a return of the first result. However, an IQ is finite in size because the silicon chip that houses the IQ is limited in area. In addition, as the size of an IQ increases, the efficiency of the IQ decreases. As such, an issue arises regarding how the IQ is divided up among multiple threads in an SMT processor, and what instructions are going to be dispatched and which will go into the IQ.

Embodiments provide effective processes for handling multiple threads in a SMT processor through the efficient division of resources, and the IQ in particular, among multiple threads being executed simultaneously. An exemplary embodiment is configured to prioritize threads with high out-of-order ILP by providing such threads with earlier dispatch to the IQ. In addition, embodiments may provide the same prioritization policy for instruction fetch in order to ensure a steady flow of decoded instructions for a high out-of-order ILP thread. Although exemplary embodiments described herein are directed towards using the out-of-order ILP prediction of threads to prioritize dispatch to the IQ, embodiments are not so limited. Out-of-order ILP prediction may be utilized for any objective that may benefit from such information, where prioritizing dispatch to the IQ is just one example.

Embodiments provide for a multi-threaded processor using a global completion table (GCT) for, inter alia, tracking an order of instructions until they are completed. The IQ may track instructions from dispatch to execution, while the GCT may track instructions from dispatch to the commit stage. In addition, the tracking function of the GCT allows a processor to recover from a branch wrong direction or target. According to embodiments, the GCT functions as a circular queue with individual head and tail pointers, wherein the instruction at the head of the GCT is the oldest in-flight instruction. At the time of issuing an instruction from the IQ, embodiments provide for determining the position of the instruction in the GCT relative to the head of the GCT. A non-limiting example demonstrates that if there are N instructions from a single thread in the GCT and the current position of an instruction being issued is greater than N/2, the issue may be defined as coming from the tail of the GCT; otherwise, the instruction is being issued from the head of the queue.

According to embodiments, a thread with more "tail" issues is considered to have a high out-of-order ILP as it benefits more from out-of-order issuance of instructions. In addition, embodiments provide that such threads may be better able to leverage an out-of-order pipeline and, therefore, may be better able to leverage a larger quantity of the GCT resource. In addition, embodiments provide for increasing the overall throughput of the multi-threaded processor by giving threads with more instructions being issued from the tail of the GCT more priority to occupy the DQ and IQ.

Figure 2:
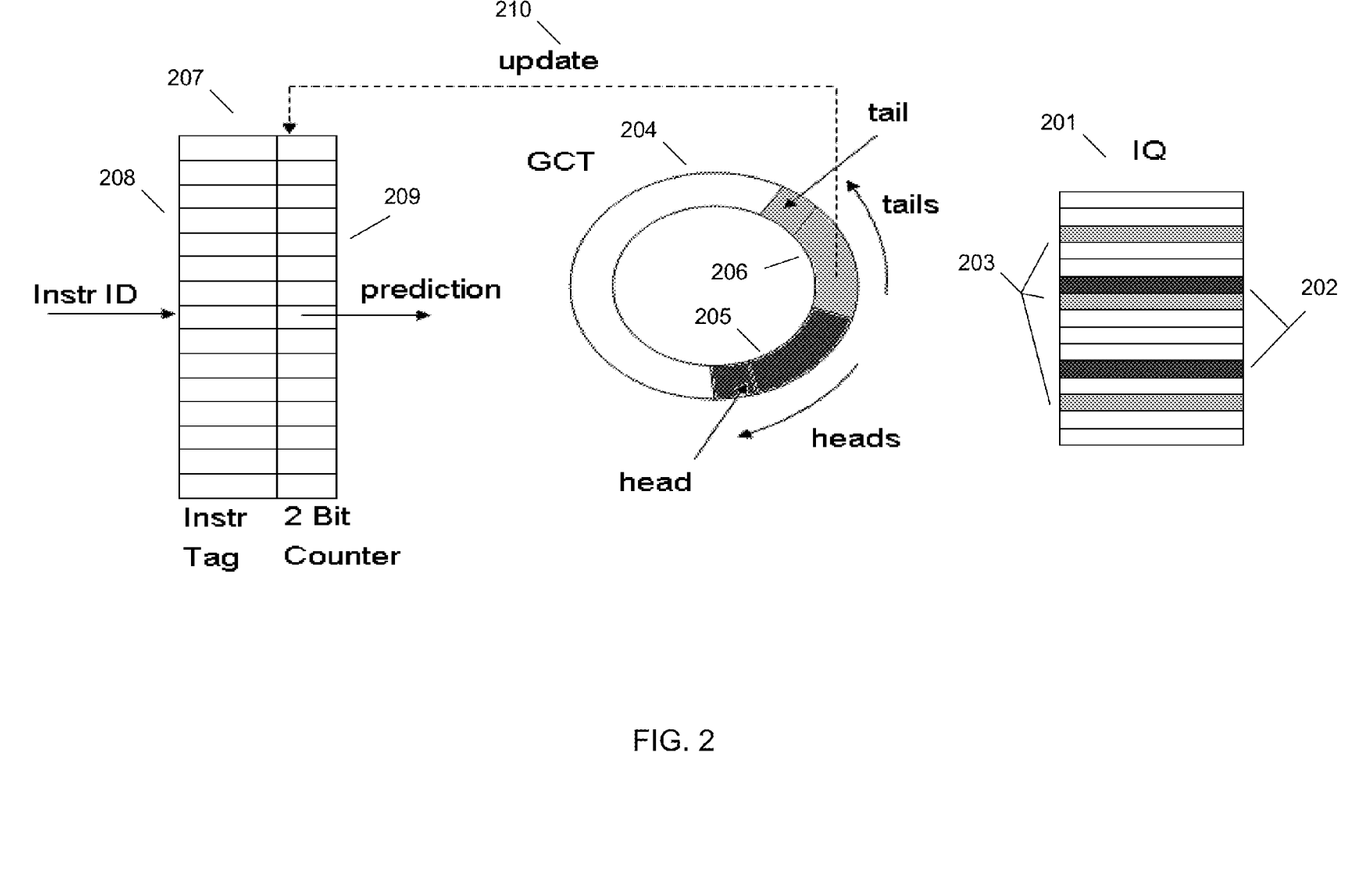
FIG. 2 provides an example of tracking thread issue queue (IQ) position according to an embodiment.

In FIG. 2, therein is provided an example illustration of a process for tracking thread IQ position according to an embodiment. An IQ 201 for a single thread contains five instructions, two "head" instructions 202 and three "tail" instructions 203. All instructions enter the IQ 201 in order, the first instruction being a head instruction. Embodiments provide that the actual number of entries in the IQ 201 determines the number of head and tail instructions. As a non-limiting example, if there is an even number of instructions, half will be head instructions and half will be tail instructions. As such, if there are eight entries in an IQ with 16 slots, there will be four head instructions and four tail instructions. If there are an odd number of instructions, then there will be one additional tail or head instruction. For example, if there are five entries, the possible configurations are two head and three tail instructions, or three head and two tail instructions. When an instruction is added, being the last or youngest instruction, it will be a tail instruction and instructions added to the IQ earlier may change or maintain their status as head or tail instructions. In a further illustration, if a first instruction is added as the first instruction to an IQ, it will be a head instruction. A second instruction added to the IQ will be the youngest instruction and will be a tail instruction and the first instruction will remain a head instruction. If a third instruction is added to the IQ, it will now be the youngest instruction and will be a tail instruction. The middle, or second, instruction will either become a head instruction or remain a tail instruction, as the middle instructions on an odd count may go either way.

As illustrated in FIG. 2, embodiments provide a GCT 204 comprised of head 205 and tail 206 segments. According to embodiments, the process may track the instructions 202, 203 to determine whether they are executing from the tail side or the head side of the IQ 201. A prediction table 207 is provided that contains an instruction ID 208 and a prediction value 209 indicating whether the process predicts the instruction will be issued from the tail or the head of the GCT 204. Embodiments provide that the instruction ID 208 may be, for example, a partial address or instruction tag. As such, the entire instruction does not need to be saved in the prediction table 207. According to embodiments, when an instruction is issued, the process determines the position of the instruction in the GCT 204 and updates 210 the prediction value 209 for the particular instruction ID 208.

At the front of the processor pipeline, embodiments provide that the address of a particular instruction may be used to access the prediction table. According to embodiments, instructions with a prediction value indicating the instruction will be issued from the tail of the GCT are given dispatch priority. For example, prediction values over a specified threshold may indicate a prediction that the instruction will issue from the tail of the GCT, while values below the threshold may indicate that the instruction will issue from the head. According to embodiments, when the instruction is issued, the system uses the actual determined position of the instruction in the GCT for the purpose of updating the prediction value of the particular instruction ID.

As a non-limiting example, a first instruction may have been issued from the head side and the tail side of the GCT in the past, while a second instruction may have always issued from the head side of the GCT. Since the second instruction always issued from the head side of the GCT, then it does not need to use the deeper part of the IQ (i.e., the tails portion). As such, the first instruction may be better suited to make usage of more of the GCT and IQ because it may issue from either the head or the tail of different possible types of instructions, such as instructions similar to the first and second instructions provided in this example and variations thereof, going into the IQ. As such, embodiments may be configured to send more instructions like the first instruction, which is better able to leverage both the heads and tails segments of the IQ.

Figure 3:
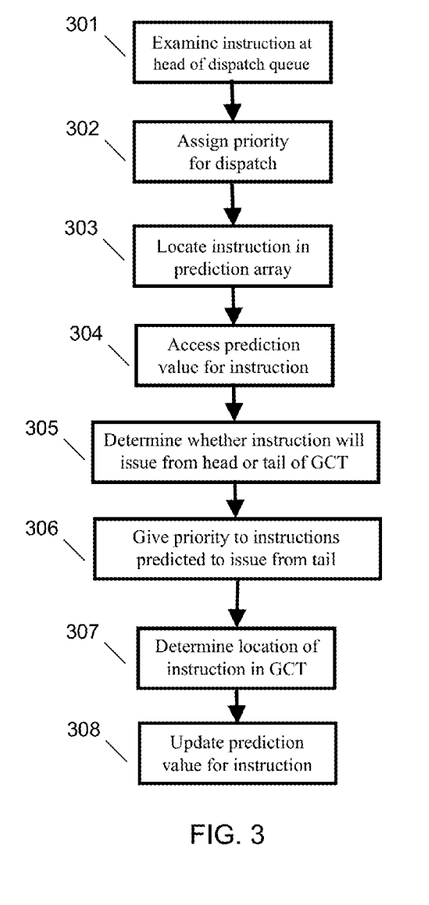
FIG. 3 provides an example flow diagram of an instruction prediction and prioritization process according to an embodiment.

Referring to FIG. 3, therein is depicted a flow diagram of an exemplary instruction issue prediction and prioritization process according to an embodiment. For each thread, the instruction at the head of the decode queue is examined 301 and the process assigns priority 302 for dispatch within the processor cycle. The process uses the address of the instruction to hash into the predictor array 303. When the instruction address is located, the process accesses the instruction prediction value 304 to determine whether the instruction is likely to issue from the tail or the head of the GCT 305. The process provides instructions from a given thread with a higher chance of issuing from the tail of the GCT priority for entry into the DQ and, consequently, entry into the IQ 306. When the instruction is chosen for execution, the process determines the position of the instruction in the GCT 307. The process updates the prediction value for the instruction in the prediction array 308. As a non-limiting example, using a two-bit prediction value, if the instruction issues from the tail of the GCT, the process may increment the predictor value by one; otherwise, the process may decrement the predictor value by one. To further illustrate, prediction values for heads, again using a two-bit value, may be comprised of 00 and 01, while values for tails may be 10 and 11. As such, every time the process predicts tails the counter is incremented by one to get closer to three. Once three is reached, the prediction value is saturated at that value. The corresponding process for tails may be to decrement the prediction value by one and saturate at a value of zero. Although the non-limiting example of a prediction value provided above comprises a two-bit value, prediction values according to embodiments are not so limited, as prediction values may be of any form capable of storing data indicating whether an instruction is likely to issue from the head or the tail. For example, a prediction value according to embodiments may be comprised of just one bit, such as 0 for heads and 1 for tails, or may be comprised of multiple bits which may possibly store additional information.

Embodiments provide for a process that uses a prediction array to track the effectiveness of thread prioritization decisions. In addition, embodiments are configured to provide corrective action, such as updating information regarding the issuance of instructions, to prevent repeated inefficient thread prioritization in the future execution of the same instructions. The prediction process, thread dispatch, and issue prioritization configurations according to embodiments described herein improve the overall efficiency of multi-threaded processors. In addition, as will be appreciated by one skilled in the art, aspects of the embodiments of prediction and prioritization processes described herein may be modified, such as by adding more information to the prediction process, including, outstanding memory accesses or branch prediction confidence.

Figure 4:
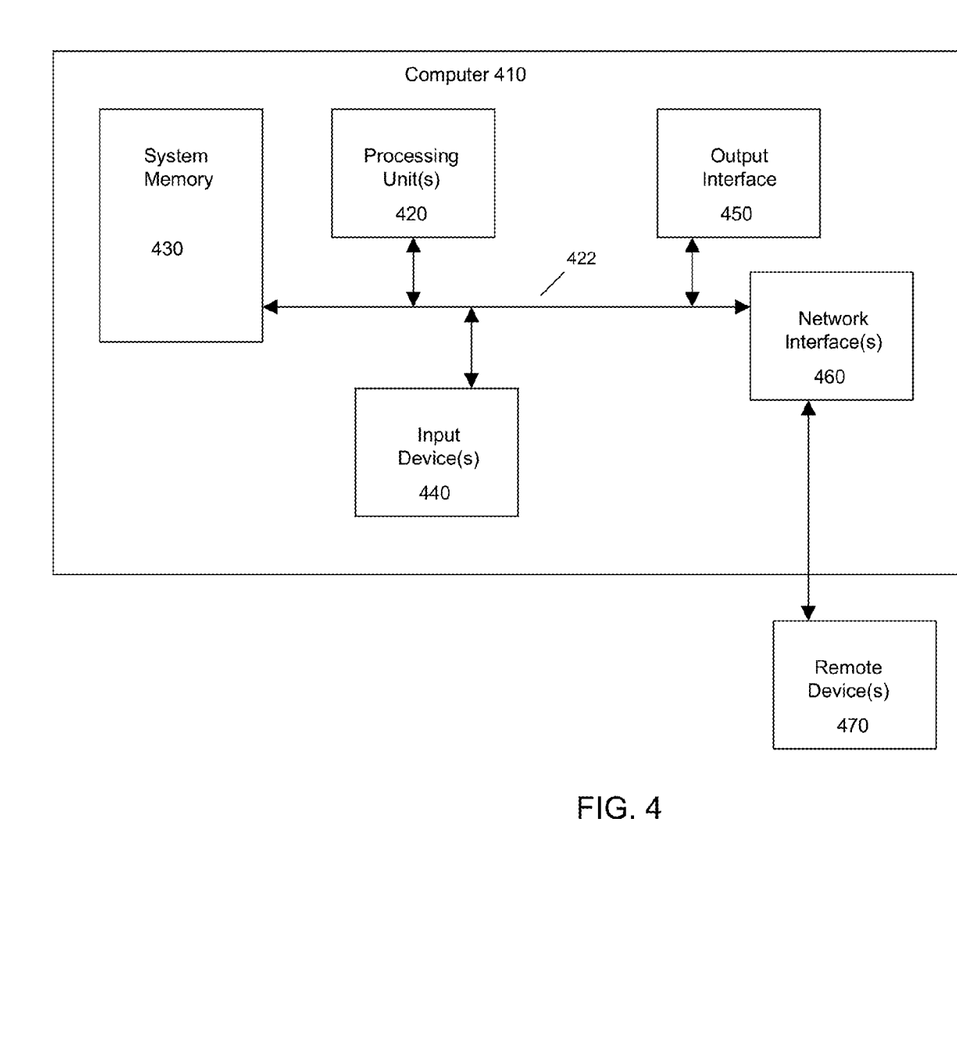
FIG. 4 illustrates an example computing device.

Referring to FIG. 4, it will be readily understood that certain embodiments can be implemented using any of a wide variety of devices or combinations of devices. An example device that may be used in implementing embodiments includes a computing device in the form of a computer 410, which may take the form of a server, a workstation computer, a mobile device, and the like. In this regard, the computer 410 may execute program instructions configured to provide predictive placement of content through network analysis, and perform other functionality of the embodiments, as described herein.

Components of computer 410 may include, but are not limited to, at least one processing unit 420, a system memory 430, and a system bus 422 that couples various system components including the system memory 430 to the processing unit(s) 420. The computer 410 may include or have access to a variety of computer readable media. The system memory 430 may include computer readable storage media in the form of volatile and/or nonvolatile memory such as read only memory (ROM) and/or random access memory (RAM). By way of example, and not limitation, system memory 430 may also include an operating system, application programs, other program modules, and program data.

A user can interface with (for example, enter commands and information) the computer 410 through input devices 440. A monitor or other type of device can also be connected to the system bus 422 via an interface, such as an output interface 450. In addition to a monitor, computers may also include other peripheral output devices. The computer 410 may operate in a networked or distributed environment using logical connections (network interface 460) to other remote computers or databases (remote device(s) 470). The logical connections may include a network, such local area network (LAN), a wide area network (WAN), a cellular network, but may also include other networks.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method of predicting out-of-order instruction-level parallelism of threads being executed in a multi-threaded processor, comprising:
   for each thread, assigning to an instruction a priority to be dispatched to an issue queue for a processor cycle;
   said assigning comprising determining, using a predictor value in a predictor array, if the instruction is associated with a position in a global completion table having a head segment and a tail segment;
   wherein instructions associated with the tail segment are prioritized for entry into the issue queue;
   issuing an instruction;
   updating a predictor value of the issued instruction, wherein the updating comprises updating the predictor value based on the issued instruction being associated with either the head segment or the tail segment; and
   thereafter prioritizing, based on the updated prediction value for an instruction, scheduling for future occurrences of the instruction.

2. The method according to claim 1, wherein the updating comprises:
   increasing the prediction value by one if the issued instruction is associated with the tail segment of the global completion table; and
   decreasing the prediction value by one if the issued instruction is associated with the head segment of the global completion table.

3. The method according to claim 1, wherein the multi-threaded processor comprises a simultaneous multi-threaded processor.

4. The method according to claim 1, wherein the multi-threaded processor comprises a fine-grained multi-threaded processor.

5. The method according to claim 1, wherein the head segment comprises an oldest instruction and the tail segment comprises a youngest instruction.

6. The method according to claim 1, wherein each instruction comprises an instruction identifier comprising a partial instruction address.

7. The method according to claim 1, wherein the prediction value comprises a two-bit value.

8. A system for predicting out-of-order instruction-level parallelism of threads, comprising:
   a multi-threaded processor configured to:
   for each thread, assign to an instruction a priority to be dispatched to an issue queue for a processor cycle by determining, using a predictor value in a predictor array, if the instruction is associated with a position in a global completion table having a head segment and a tail segment,
   wherein instructions associated with the tail segment are prioritized for entry into the issue queue;
   issue an instruction;
   update a predictor value of the issued instruction based on the issued instruction being associated with either the head segment or the tail segment; and
   thereafter prioritize, based on the updated prediction value for an instruction, scheduling for future occurrences of the instruction.

9. The system according to claim 8, wherein the predictor value is updated by:
   increasing the prediction value by one if the issued instruction is associated with the tail segment of the global completion table; and
   decreasing the prediction value by one if the issued instruction is associated with the head segment of the global completion table.

10. The system according to claim 8, wherein the multi-threaded processor comprises a simultaneous multi-threaded processor.

11. The system according to claim 8, wherein the multi-threaded processor comprises a fine-grained multi-threaded processor.

12. The system according to claim 8, wherein the multi-threaded processor executes instructions utilizing a pipeline comprising an issue queue.

13. The system according to claim 8, wherein the head segment comprises an oldest instruction and the tail segment comprises a youngest instruction.

14. The system according to claim 8, wherein each the instruction comprises an identifier comprising a partial instruction address.

15. The system according to claim 8, wherein the prediction value comprises a two-bit value.

16. A computer program product comprising:
   a non-transitory computer readable storage medium having computer readable program code, the code being executable by a processor, configured to predict out-of-order instruction-level parallelism of threads being executed in a multi-threaded processor embodied therewith, the computer readable program code comprising:
   computer readable program code configured to, for each thread, assign to an instruction a priority to be dispatched to an issue queue for a processor cycle by determining, using a predictor value in a predictor array, if the instruction is associated with a position in a global completion table having a head segment and a tail segment;
   wherein instructions associated with the tail segment are prioritized for entry into the issue queue;
   computer readable program code configured to issue an instruction;
   computer readable program code configured to update a predictor value of the issued instruction based on the issued instruction being associated with either the head segment or the tail segment;
and computer readable program code configured to thereafter prioritize, based on the updated prediction value for an instruction, scheduling for future occurrences of the instruction.

\* \* \* \* \*